(12) United States Patent
Kwak et al.

(10) Patent No.: US 10,953,457 B2
(45) Date of Patent: Mar. 23, 2021

(54) END PIECE FOR CAMSHAFT AND METHOD OF MANUFACTURING THE SAME

(71) Applicants: Hyundai Motor Company, Seoul (KR); Kia Motors Corporation, Seoul (KR)

(72) Inventors: Hyung-Seok Kwak, Gunpo-si (KR); Jin-Hyeon Lee, Busan (KR); Gi-Bum Kim, Seoul (KR); Yeong-Cheol Jo, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 15/818,594

(22) Filed: Nov. 20, 2017

(65) Prior Publication Data

US 2018/0161846 A1 Jun. 14, 2018

(30) Foreign Application Priority Data

Dec. 14, 2016 (KR) ........................ 10-2016-0170746

(51) Int. Cl.
| | |
|---|---|
| *B22F 7/08* | (2006.01) |
| *B22F 5/00* | (2006.01) |
| *B22F 7/04* | (2006.01) |
| *B21D 53/84* | (2006.01) |
| *B21C 23/08* | (2006.01) |
| *F16H 53/02* | (2006.01) |

(Continued)

(52) U.S. Cl.
CPC ............ *B21D 53/845* (2013.01); *B21C 23/08* (2013.01); *B21D 53/84* (2013.01); *B21K 1/06* (2013.01); *B21K 25/00* (2013.01); *B22F 3/03* (2013.01); *B22F 5/008* (2013.01); *B22F 7/08* (2013.01); *C22C 1/05* (2013.01); *F01L 1/047* (2013.01); *F16H 53/025* (2013.01); *B22F 7/04* (2013.01); *B22F 2003/033* (2013.01); *B22F 2998/10* (2013.01); *B23P 2700/02* (2013.01); *C22C 33/0214* (2013.01); *F01L 2301/00* (2020.05); *F01L 2303/01* (2020.05); *F01L 2810/02* (2013.01)

(58) Field of Classification Search
CPC .... B21D 53/845; B23P 2700/02; B22F 3/004; B22F 3/12; B22F 3/16; B22F 5/008; B22F 7/04; B22F 7/02; B22F 7/08; B22F 2003/033; F16C 2220/20
See application file for complete search history.

(56) References Cited

U.S. PATENT DOCUMENTS

| | | | | |
|---|---|---|---|---|
| 7,998,401 | B2 * | 8/2011 | Okaniwa | B22F 3/105 419/10 |
| 2001/0016977 | A1 * | 8/2001 | Moro | B22F 7/08 29/606 |
| 2016/0035472 | A1 * | 2/2016 | Draper | H01F 3/10 361/210 |

FOREIGN PATENT DOCUMENTS

| | | |
|---|---|---|
| CN | 1243053 A | 2/2000 |
| CN | 1304145 A | 7/2001 |

(Continued)

*Primary Examiner* — Christopher J Besler
(74) *Attorney, Agent, or Firm* — Morgan, Lewis & Bockius LLP

(57) ABSTRACT

A method of manufacturing an end piece for a camshaft may include forming a shape of an end piece to be coupled to a camshaft by compacting steel and powder in a net-shape manner and by sintering steel and a powder compact that are preassembled to each other.

5 Claims, 11 Drawing Sheets

(51) Int. Cl.
*B22F 3/03* (2006.01)
*F01L 1/047* (2006.01)
*B21K 25/00* (2006.01)
*B21K 1/06* (2006.01)
*C22C 1/05* (2006.01)
*C22C 33/02* (2006.01)

(56) References Cited

FOREIGN PATENT DOCUMENTS

KR  10-2008-0066079 A   7/2008
KR  20-2010-0010947 U   11/2010

\* cited by examiner

END PIECE FOR CAMSHAFT AND METHOD OF MANUFACTURING THE SAME

CROSS-REFERENCE(S) TO RELATED APPLICATIONS

The present application claims priority to Korean Patent Application No. 10-2016-0170746, filed on Dec. 14, 2016, the entire contents of which is incorporated herein for all purposes by this reference.

BACKGROUND OF THE INVENTION

Field of the Invention

The present invention relates to an end piece for a camshaft, and more particularly, to an end piece for a camshaft which is provided at a longitudinal end portion of a camshaft, and a method of manufacturing the same.

Description of Related Art

In general, a vehicle engine includes a plurality of pistons disposed between a cylinder block and a cylinder head, and the vehicle engine generates power by a reciprocating motion of the pistons.

The pistons reciprocate by combustion of fuel injected into a combustion chamber. The combustion chamber is opened or closed to be suitable for intake, compression, explosion, and exhaust strokes therein during the combustion of fuel.

That is, the above four strokes are smoothly performed while intake and exhaust valves disposed and configured to open or close the combustion chamber are operated by a camshaft.

A plurality of cams are disposed on and coupled to a rod-shaped camshaft at regular intervals to sequentially open or close intake and exhaust valves.

Typically, a cam sprocket, a gear, an oil control valve, etc. are disposed at the end portion of a camshaft according to the requirements of an engine. The above parts are mounted to the camshaft through an end piece since they are not directly connected to the camshaft.

A conventional end piece is manufactured by processing steel (S45C) as a raw material at a level of 40 to 60% until it has a final shape and is coupled to the end portion of a camshaft by pressure welding.

However, it is difficult to form the end piece by powder metallurgy due to the long length of the end piece, and the joint portions between the end piece and the camshaft need to use the same material to bond the end piece to the camshaft by brazing or friction welding.

For the present reason, the cost to manufacture the end piece may increase and the camshaft may be fixed under an engine load in a low-temperature and non-lubricated state.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an end piece for a camshaft, configured for having an advantage in terms of cost and no issues in a joint portion with a camshaft since the end piece is not made entirely of steel, and a method of manufacturing the same, configured for more effectively performing a forming process.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method of manufacturing an end piece for a camshaft includes forming a shape of an end piece to be coupled to a camshaft by compacting steel and powder in a net-shape manner, and by sintering steel and a powder compact that are preassembled to each other.

The method may include arranging a die having a drawing hole formed therein, a lower ram punch inserted into a lower side of the drawing hole, and an upper ram punch inserted into an upper side of the drawing hole, and inserting the steel into the drawing hole.

The upper ram punch may have an internal diameter corresponding to an external diameter of the steel, and the lower ram punch may have a double structure including a lower internal ram configured to correspond to a diameter of the steel and a lower external ram having a greater diameter than the lower internal ram configured to correspond to the diameter of the steel.

Alternatively, the lower ram punch may have a triple structure including a lower internal ram, a lower middle ram, and a lower external ram. An end portion of the lower middle ram external to the lower internal ram may be disposed to be higher than an end portion of the lower internal ram, and the steel may be seated on and inserted into the end portion of the lower internal ram.

The method may further include filling the drawing hole with the powder.

The upper ram punch may have a double structure including an upper internal ram and an upper external ram, and the method may further include performing contact of the upper internal ram with an upper side of the steel.

The upper external ram may press and compact the powder filled in the drawing hole.

The powder may be pressed to have a density of 6.6 g/cc or greater.

The method may further include forming a blow hole in the powder compact for lubrication after the compacted preassembly is sintered.

Meanwhile, a joint portion of the steel with the powder compact may be formed with relief or intaglio.

In accordance with another exemplary embodiment of the present invention, an end piece for a camshaft includes steel bonded to a camshaft, and a powder compact bonded around a rear end portion of the steel.

The powder compact may be compacted by a punch on a die to be preassembled to the steel, and the preassembled steel and the powder compact may be bonded to each other by sintering.

The powder compact may be pressed and preassembled wherein powder has a density of 6.6 g/cc.

The powder may include adding graphite and copper (Cu) powder to iron (Fe) or iron powder, and by mixing with a lubricant for lubrication of a mold.

The powder may include further adding phosphorus (P) powder thereto.

Meanwhile, a joint portion of the steel with the powder compact may be formed with relief or intaglio.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
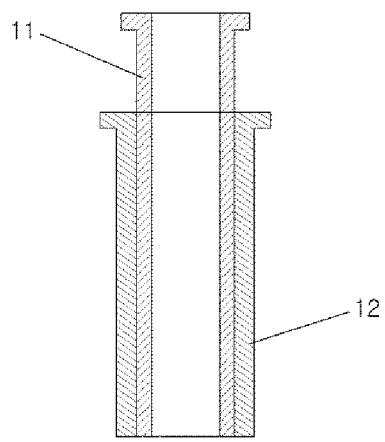
FIG. 1, FIG. 2, FIG. 3, FIG. 4, FIG. 5, FIG. 6, and FIG. 7 are views illustrating a method of manufacturing an end piece for a camshaft according to an exemplary embodiment of the present invention in the order of processes.
Figure 1:
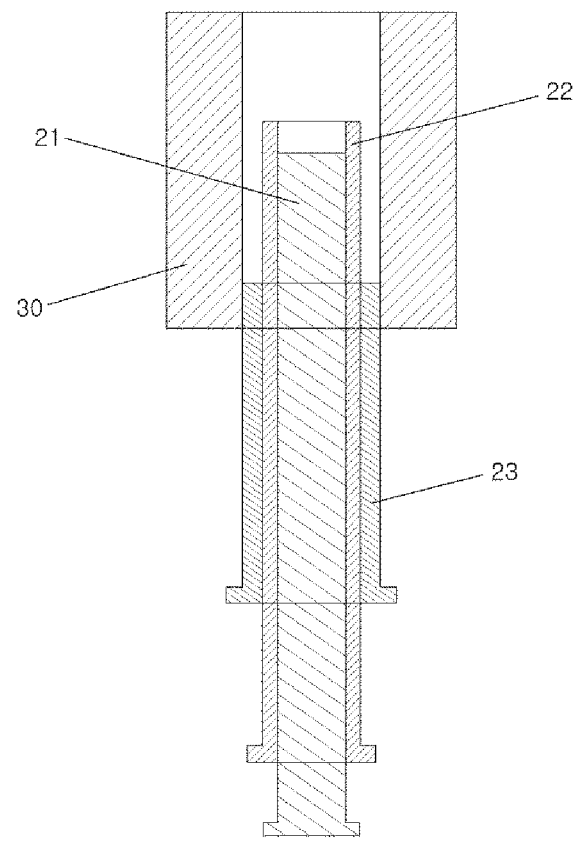

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirt and scope of the invention as defined by the appended claims.

The accompanying drawings for illustrating exemplary embodiments of the present invention are referred to gain a sufficient understanding of the present invention, the merits thereof, and the objectives accomplished by the implementation of the present invention.

In certain embodiments, detailed descriptions of device constructions or processes well-known in the art may be omitted to avoid obscuring appreciation of the disclosure by a person of ordinary skill in the art.

Various aspects of the present invention are directed to providing an end piece for a camshaft, which includes not only steel (S45C) by a conventional forming method, but includes dissimilar materials of steel and powder, and a method of manufacturing the same, which is advantageous in terms of process efficiency and cost.

To this end, the method of manufacturing an end piece for a camshaft according to an exemplary embodiment of the present invention directly manufactures a shape close to the final product by net-shape forming, instead of a typical forming process, by powder metallurgy, namely, by compacting and then sintering powder at a temperature equal or less than the material's melting temperature.

That is, the method manufactures the end piece by forming dissimilar materials of steel and powder to locate steel at a lower ram in a drawing hole of a die and then insert powder into the drawing hole, and to compact the powder by combination of upper and lower rams.

Through such a method, the end piece to be manufactured may be formed in various shapes, wherein the upper and lower rams may each be provided in a single form or may be provided in a double or triple form.

The upper ram is provided in a single structure while having an internal diameter corresponding to the external diameter of steel, and may be configured to compact the powder.

On the other hand, the lower ram is preferably divided into two or more parts wherein steel and powder are sorted by different layers in the center hole that is formed in the end piece to be manufactured.

Ultimately, the configurations and forms of the upper and lower rams and the die may differ from each other depending on the shape of the end piece to be manufactured in an exemplary embodiment of the present invention. In addition, the present invention can reduce manufacturing cost while having no problem in bonding between the end piece and the camshaft since the end piece is manufactured by compacting dissimilar materials of steel and powder in a net-shape manner, and then sintering steel and a powder compact that are preassembled by compaction.

Hereinafter, an exemplary embodiment of the present invention will be described in more detail with reference to FIG. 1 to FIG. 7.

FIG. 1 to FIG. 7 illustrate a method of manufacturing an end piece using a double upper ram and a triple lower ram according to an exemplary embodiment of the present invention.

A die 30, which has an internal diameter corresponding to the external diameter of an end piece to be manufactured, and lower and upper ram punches are first located as illustrated in FIG. 1.

The upper ram punch has a double structure that includes an upper internal ram 11 and an upper external ram 12. The upper internal ram 11 is formed to correspond to the diameter of a center hole that is formed in the end piece to be manufactured, and is inserted into the upper external ram 12. The upper external ram 12 has a diameter corresponding to the internal diameter of the die 30.

Although the object of the present invention may be accomplished only by the upper external ram, the addition of the upper internal ram may be advantageous to fix steel.

The lower ram punch has a triple structure that includes a lower internal ram 21, a lower middle ram 22, and a lower external ram 23. The lower middle ram 22 is inserted into the lower external ram 23, and the lower internal ram 21 is inserted into the lower middle ram 22.

Although the object of the present invention may be accomplished by combination of the upper ram and the double structure of the lower middle and internal rams, the triple structure by which the lower external ram is added may be more advantageous to compact powder.

The lower internal ram 21 is formed to correspond to the diameter of steel 110, the lower middle ram 22 has a diameter corresponding to the center hole that is formed in the end piece, and the lower external ram 23 has a diameter corresponding to the internal diameter of the die 30.

As illustrated in the drawings, the lower middle and internal rams 22 and 21 of the lower ram punch are partially inserted into the drawing hole of the die 30.

Figure 2:
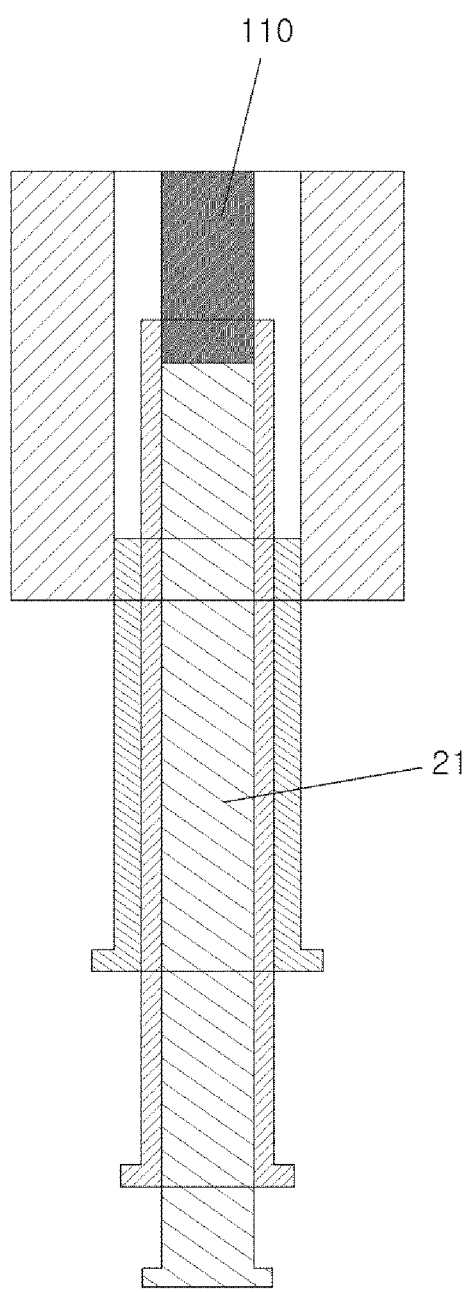

In a state in which the height of the inserted lower internal ram 21 is lower than the height of the lower middle ram 22, as illustrated in FIG. 1, the steel 110 is inserted into the lower middle ram 22, as illustrated in FIG. 2.

Figure 3:
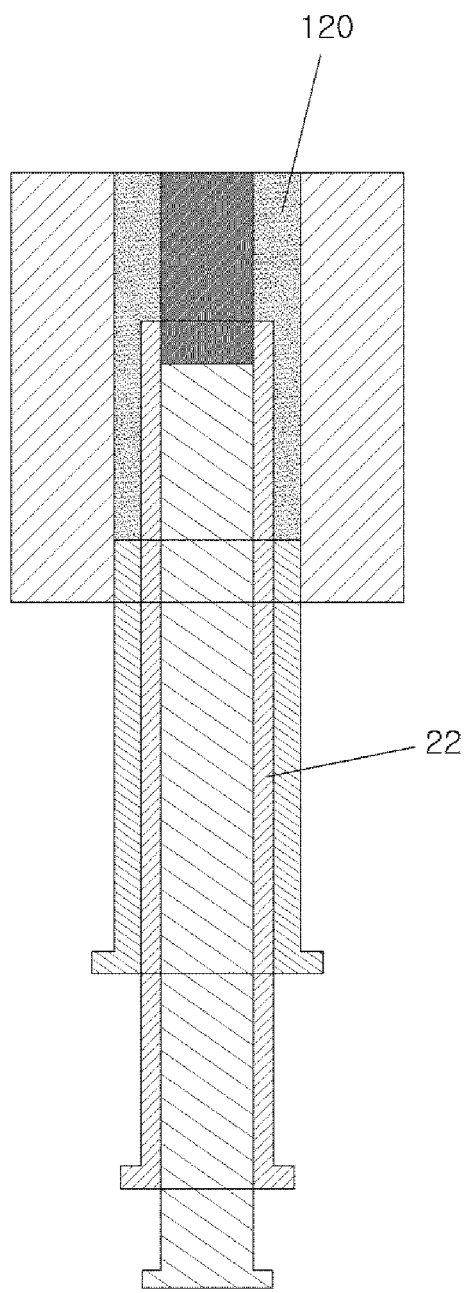

When the drawing hole is filled with powder 120, the powder 120 is filled in a volume between the internal surface of the die 30, the steel 110, and the lower middle ram 22 in the drawing hole, as illustrated in FIG. 3.

The powder 120 may include adding graphite and copper (Cu) powder to iron (Fe) or iron powder, which is melted and alloyed, and by mixing with a lubricant for lubrication of a mold.

In addition, the powder 120 may include further adding phosphorus (P) thereto. The powder 120 is liquefied during sintering when the phosphorus (P) is added to the powder 120, and it is therefore possible to further improve a bonding power between the powder 120 and the steel 110.

Figure 4:
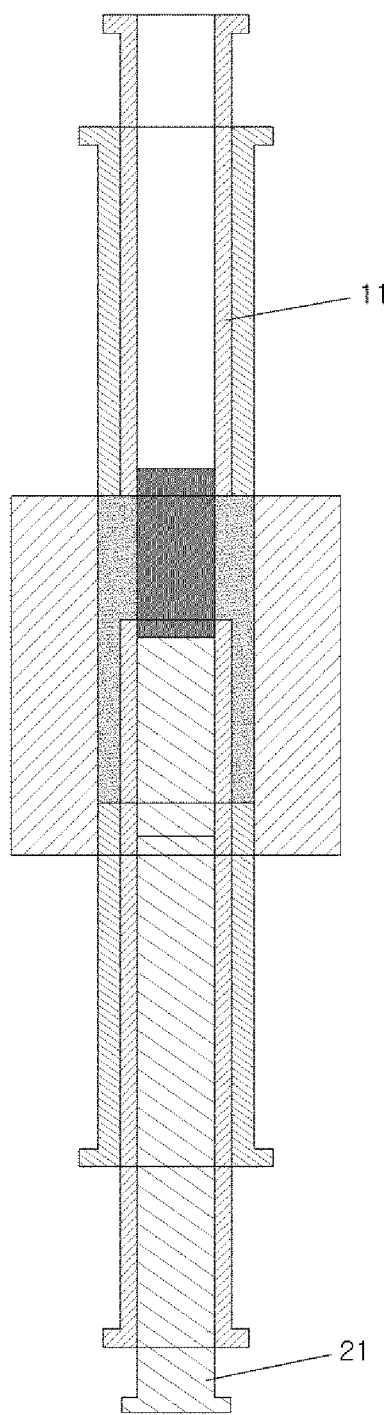

To insert the upper ram punch in the present state, after the lower internal ram 21 is moved partially upwards and the upper internal ram 11 is pulled back wherein the end height of the upper internal ram 11 is higher than the end height of the upper external ram 12, the steel 110 is inserted into the upper external ram 12, as illustrated in FIG. 4.

To prevent the upper internal ram 11 from colliding with the steel 110, the upper internal ram 11 may have a tapered portion or an R or C shape which is formed at the end portion thereof.

Figure 5:
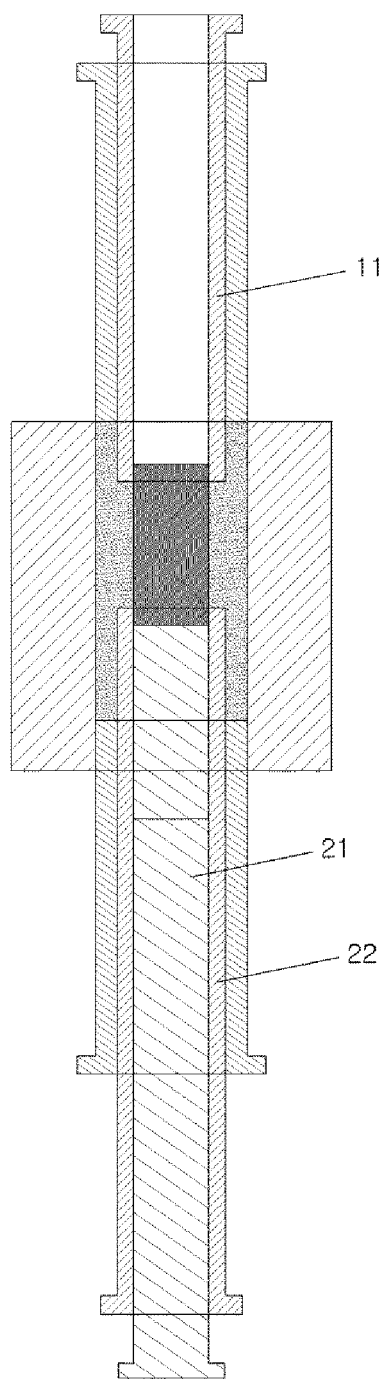

Next, the upper internal ram 11 is moved downward to move the powder 120 for forming it by punching, and as a result, the lower internal ram 21 and the lower middle ram 22 are moved downward by the same degree, as illustrated in FIG. 5.

Figure 6:
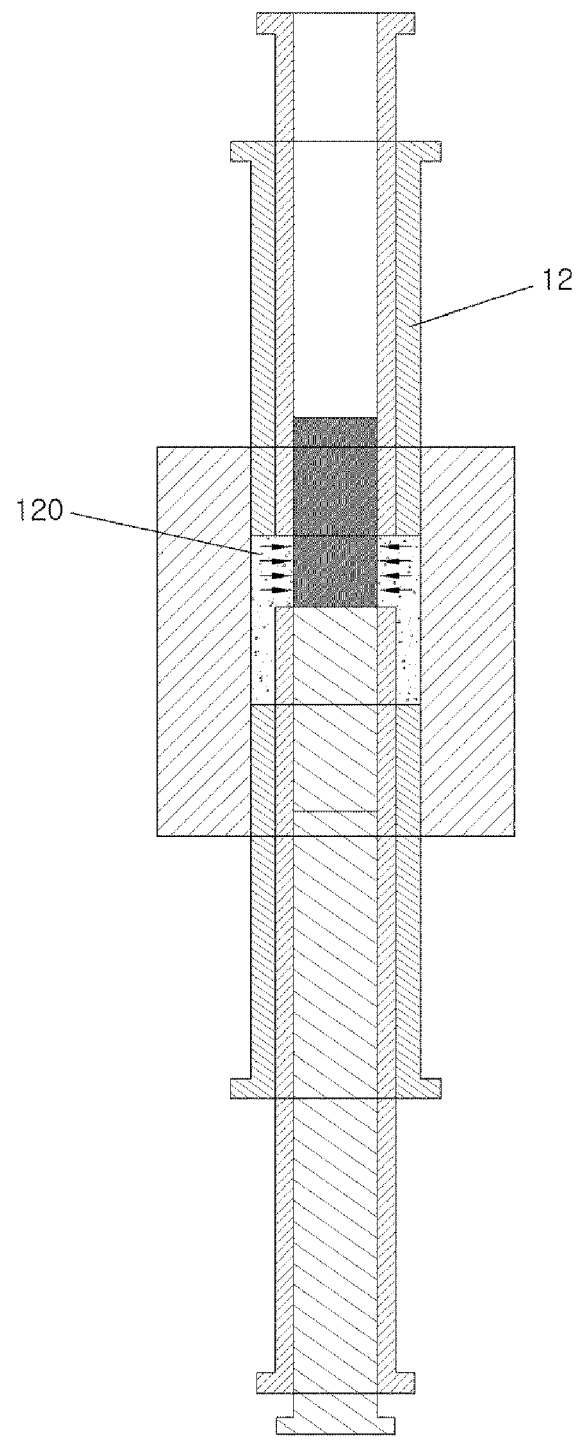

In the present state, when the upper external ram 12 is punched, as illustrated in FIG. 6, the powder 120 is compacted and pressed by a pressure formed horizontally, forming a powder compact 121.

The powder is preferably compacted and pressed to have a density of 6.6 g/cc or greater.

Figure 7:
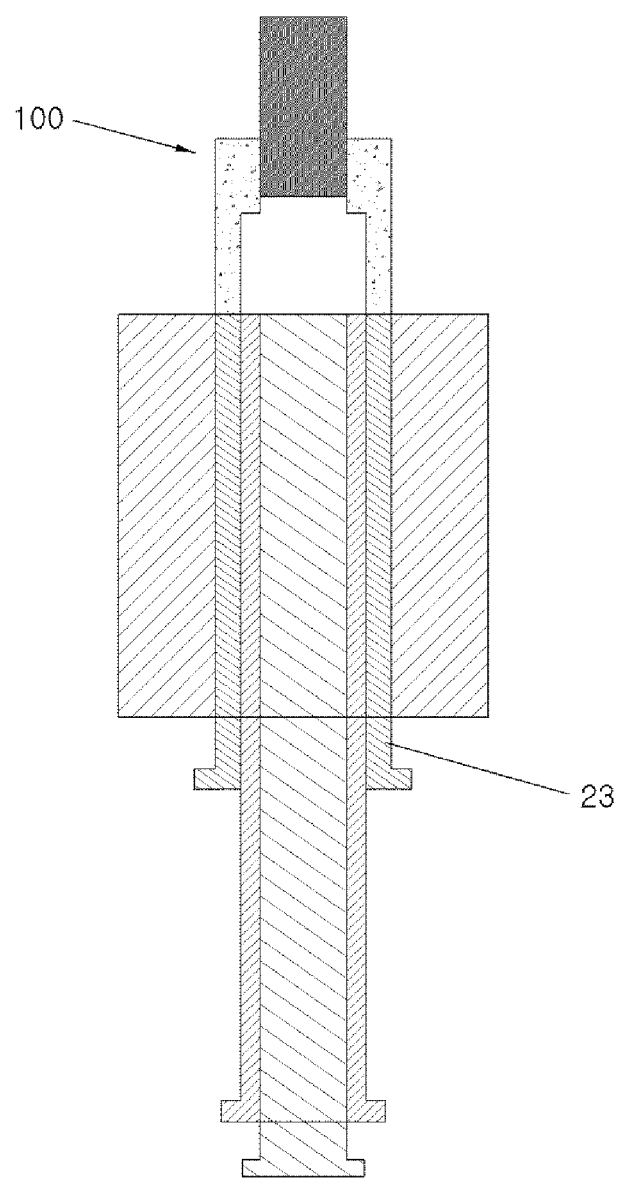

After the compaction and formation, the upper ram punch is removed and the end piece 100 is drawn out by the upward movement of the lower external ram 23, as illustrated in FIG. 7. In the present case, the end portion piece includes dissimilar materials in a state in which the powder is preassembled to the steel by pressing.

Next, the bonding process is performed by sintering wherein the body of the end piece clamps the preassembly formed with the steel at a minus dimensional variation rate by sinter diffusion bonding and necking between powders.

Blow holes may be formed without a separate process while the lubricant added for lubrication of the mold is removed as particles between powders are bonded to each other. Therefore, the blow holes help to lubricate the end piece when it is manufactured.

However, the steel may be separated from the powder compact before sintering in the state in which the steel is preassembled to the powder compact by the horizontal pressure. That is, it is difficult to maintain the preassembly including the steel and the powder compact in place until the steel and the powder compact are chemically bonded to each other by sintering.

The present example of application will be described with reference to FIG. 8 and FIG. 9.

Figure 8A:
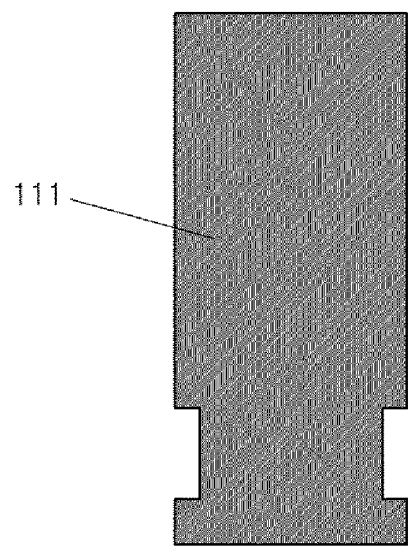
FIG. 8A and FIG. 8B are views illustrating an example of application of a steel portion of an end piece manufactured by the method according to the exemplary embodiment of the present invention.
Figure 8B:
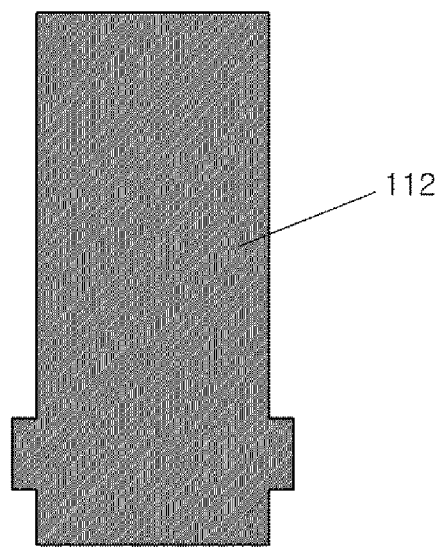

As illustrated in FIG. 8A and FIG. 8B, the joint portion of the steel 111 or 112 with the powder compact 121 is formed with relief or intaglio to fix the bonded position of the preassembled steel and the powder compact and improve the bonding power between the two materials by increasing a bonding area.

Figure 9A:
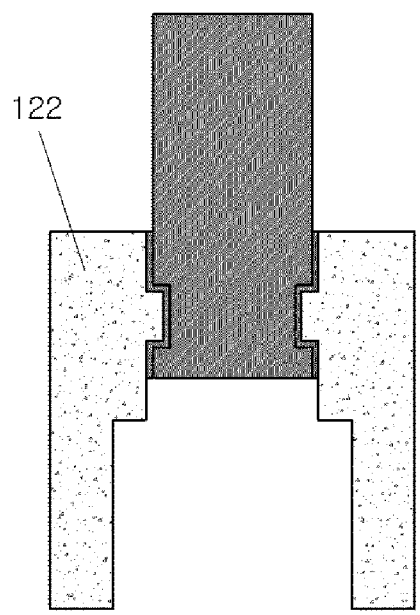
FIG. 9A and FIG. 9B are views illustrating the end piece to which the steel portion in FIG. 8 is applied.
Figure 9B:
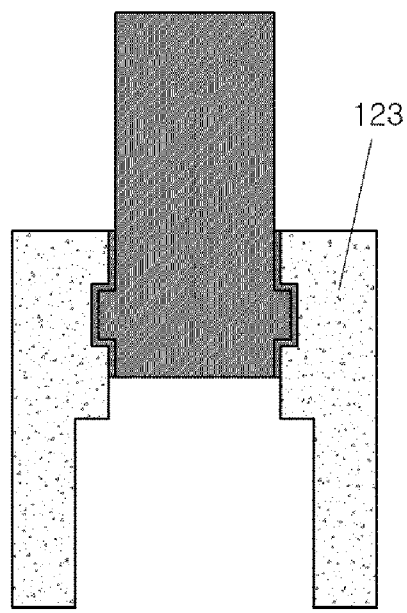

When the steel is formed in the present shape, the end piece cannot be manufactured by combination of the steel and the powder compact. However, the end piece can be manufactured by compacting powder as described above. As illustrated in FIG. 9A and FIG. 9B, the end piece which is preassembled to the powder compact 122 or 123 can have increased bonding power between dissimilar materials.

As described above, the method of manufacturing an end piece for a camshaft according to the exemplary embodiment of the present invention can manufacture the end piece including dissimilar materials. Accordingly, there is no problem in that the end piece is coupled to the camshaft since the camshaft comes into contact with the steel. Therefore, it is advantageous in terms of process and manufacturing cost.

In accordance with a method of manufacturing an end piece for a camshaft according to the exemplary embodiments of the present invention, it is possible to reduce manufacturing costs since an end piece manufactured by the present method includes not only steel dissimilar materials including powder.

Since the dissimilar materials are able to be formed in a net-shape manner by powder metallurgy, the end piece can be formed with more effectiveness while having a shape close to the raw material.

Since the end piece is bonded to a camshaft in a steel portion in spite of including the dissimilar materials in the present way, there is no problem in that the end piece is coupled to the camshaft.

In addition, since blow holes for lubrication are formed on a powder compact without a separate process, it is more advantageous to lubrication action.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing an end piece for a camshaft, the method comprising:
   arranging a die having a drawing hole formed therein, a lower ram punch inserted into a lower side of the drawing hole, and an upper ram punch inserted into an upper side of the drawing hole;
   inserting a steel into the drawing hole;
   filling the drawing hole with powder;
   compacting the steel and the powder; and
   sintering the steel and the powder, wherein the lower ram punch has a lower external ram having an outer diameter corresponding to an inner diameter of the drawing hole of the die and inserted into the lower side of the drawing hole, a lower middle ram disposed inside the lower external ram, and a lower internal ram disposed inside the lower middle ram, wherein the lower internal ram is disposed radially internal to the lower middle ram and an upper surface of the lower internal ram is lower than an upper surface of the lower middle ram and an upper surface of the lower external ram is lower than the upper surface of the lower internal ram before the steel is inserted to place on the upper surface of the lower internal ram, and wherein the powder is filled between an inner surface of the drawing hole of the die and an outer surface of the lower middle ram and the steel.

2. The method of claim 1, wherein the upper ram punch has a double structure including an upper internal ram and an upper external ram having an outer diameter corresponding to an inner diameter of the die, wherein the upper internal ram disposed radially internal to the upper external ram and an inner diameter of the upper internal ram is correspondent to an inner diameter of the lower middle ram, and wherein the method further includes elevating the lower internal ram so that the steel is inserted inside the upper internal ram.

3. The method of claim 2, further including:

pressing and compacting the powder filled in the drawing hole by the upper external ram descending the upper internal ram to press the powder; and descending the upper outer ram to mess the powder.

4. The method of claim 3, wherein the powder is pressed to have a density of 6.6 g/cc or greater.

5. The method of claim 1, wherein a joint portion of the steel with a powder compact is formed with relief or intaglio.

* * * * *